US011321090B2

(12) United States Patent
Leidal

(10) Patent No.: US 11,321,090 B2
(45) Date of Patent: May 3, 2022

(54) SERIALIZING AND/OR DESERIALIZING PROGRAMS WITH SERIALIZABLE STATE

(71) Applicant: Posh Development LLC, Boston, MA (US)

(72) Inventor: Kenneth Knute Leidal, Cambridge, MA (US)

(73) Assignee: Posh Development LLC, Boston, MA (US)

( * ) Notice: Subject to any disclaimer, the term of this patent is extended or adjusted under 35 U.S.C. 154(b) by 305 days.

(21) Appl. No.: 16/448,715

(22) Filed: Jun. 21, 2019

(65) Prior Publication Data

US 2019/0391809 A1 Dec. 26, 2019

Related U.S. Application Data

(60) Provisional application No. 62/689,024, filed on Jun. 22, 2018.

(51) Int. Cl.
*G06F 9/30* (2018.01)
*G06F 9/50* (2006.01)
*G06F 9/48* (2006.01)

(52) U.S. Cl.
CPC .......... *G06F 9/30087* (2013.01); *G06F 9/485* (2013.01); *G06F 9/5027* (2013.01)

(58) Field of Classification Search
None
See application file for complete search history.

(56) References Cited

U.S. PATENT DOCUMENTS

| 8,171,137 B1 * | 5/2012 | Parks ...................... H04L 29/06 709/224 |
| 9,471,438 B1 * | 10/2016 | Jacques Da Silva ........................ G06F 11/1451 |
| 2018/0336897 A1 * | 11/2018 | Aggarwal ............. G10L 15/222 |

OTHER PUBLICATIONS

[No Author Listed], Application checkpointing. Wikipedia. en.wikipedia.org/wiki/Application_checkpointing last accessed Jun. 25, 2019. 6 pages.
[No Author Listed], Designing thread pickling or "the Essence of Stackless Python". PyPy. doc.pypy.org/en/latest/discussion/howtoimplementpicklin.html?highlight=pickle last accessed Jun. 25, 2019. 4 pages.

(Continued)

*Primary Examiner* — Eric C Wai
(74) *Attorney, Agent, or Firm* — Wolf, Greenfield & Sacks, P.C.

(57) ABSTRACT

Described herein are techniques for suspending execution of a process, including through serializing execution state of the process. Through serializing the execution state, the execution state can be converted to a byte string for output. In some embodiments, an executing process that has been suspended may be resumed, through deserializing the execution state. For example, a byte string that is a serialized execution state of a suspended process may be deserialized to generate one or more data objects for the execution state of the suspended process, and a process may be configured with the data objects resulting from the deserializing. By configuring the process with the data objects resulting from the deserializing, the process may take on the execution state of the suspended executing process and resume execution from the point of suspension. The process that may be suspended may be an instance of a request/response application.

18 Claims, 6 Drawing Sheets

(56) References Cited

OTHER PUBLICATIONS

Kruis, Applications. GitHub. github.com/stackless-dev/stackless/wiki/Applications last accessed Jun. 25, 2019. 3 pages.
Kruis, Pickling. GitHub. github.com/stackless-dev/stackless/wiki/Pickling last accessed Jun. 25, 2019. 7 pages.
Mckerns, dill Documentation. Release 0.3.0.dev0. Build Media. buildmedia.readthedocs.org/media/pdf/dill/latest/dill.pdf Jun. 22, 2019. last accessed Jun. 25, 2019. 24 pages.

* cited by examiner

SERIALIZING AND/OR DESERIALIZING PROGRAMS WITH SERIALIZABLE STATE

RELATED APPLICATIONS

The present application claims the benefit under 35 U.S.C. § 119(e) of U.S. Provisional Patent Application No. 62/689,024, filed Jun. 22, 2018 and titled "Techniques for generating programs executable with serializable state," the entire contents of which are incorporated herein by reference.

TECHNICAL FIELD

Various embodiments described herein relate to techniques for efficiently managing session state during a series of requests/responses and for managing execution of a process in a request/response framework, including for managing session state, and for suspending execution of an executing process. In some embodiments, when execution is suspended, execution state of the process (which may include session state) may be serialized and stored. Examples are described of approaches to using session state management techniques in implementing and operating server-side conversational agents, but other embodiments are not limited in this respect and the techniques could be used in other contexts.

BACKGROUND

In many client/server systems, there may be multiple client devices and/or client-side users interacting with the server side of a system. The load of interacting with the multiple client devices/users may be distributed between multiple different server-side processes, with each server-side process interacting with one or more client-side devices or users. Such server-side processes may each be an instance of a server-side application. The server-side processes may be run on one or more computing devices.

In some cases, one of the server-side cases may occasionally wait for input from one or more of the client-side devices/users. In such a case, a server-side process may not have tasks to perform, but may be maintained as an active and executing process by an operating system of a computing device on which the server-side process is running.

SUMMARY

In one embodiment, there is provided a method comprising instantiating a request/response application as at least a first process, the first process being associated with an execution state. The method further comprises, in response to receiving a request from the first process to suspend execution of the first process, serializing execution state of the first process and terminating the first process. The execution state comprises one or more data objects indicating a session state for a series of one or more request/response interactions between the request/response application and at least one other entity. Serializing the execution state comprises converting a first plurality of data objects of the execution state to a byte string. The first plurality of data objects comprise at least some of the one or more data objects indicating the session state. The method further comprises, in response to receiving a new request from the at least one other entity following terminating of the first process, instantiating the request/response application as at least a second process, deserializing the execution state of the first process, and configuring execution state of the second process based on the second plurality of data objects and the new request received from the at least one other entity. Deserializing the execution state comprises converting the byte string to a second plurality of data objects. The second plurality of data objects includes the at least some of the one or more data objects indicating the session state for the series of one or more request/response interactions of the request/response application.

In another embodiment, there is provided at least one computer-readable storage medium having encoded thereon executable instructions that, when executed by at least one processor, cause the at least one processor to carry out a method. The method comprises receiving a request to suspend execution of an executing process, the executing process being an instance of a request/response application and, in response to the request, serializing execution state of the executing process. Serializing the execution state comprises converting a plurality of data objects of the execution state to a byte string, wherein the plurality of data objects comprise one or more data objects indicating a session state for a series of one or more request/response interactions between the instance of the request/response application and at least one other entity. The method further comprises outputting the byte string and terminating the executing process.

In a further embodiment, there is provided an apparatus comprising at least one processor and at least one storage medium having encoded thereon executable instructions that, when executed by at least one processor, cause the at least one processor to carry out a method. The method comprises serializing execution state of an executing process, the executing process being an instance of a request/response application and corresponding to a session between the request/response application and at least one other entity. The execution state comprises a first plurality of data objects, the first plurality of data objects comprising one or more data objects indicating a session state for the session. The session state indicates at least a result of a series of one or more request/response interactions of the request/response application and the at least one other entity. The serializing comprises identifying, in the first plurality of data objects of the execution state, one or more second data objects that are global variables for the request/response application, and converting at least some of the first plurality of data objects to a byte string, wherein the converting comprises refraining from converting the one or more second data objects that are global variables.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3, including

DETAILED DESCRIPTION

Figure 1:
FIG. 1 is a diagram of operations of an illustrative request/response system, with which some embodiments may operate.
Figure 1:
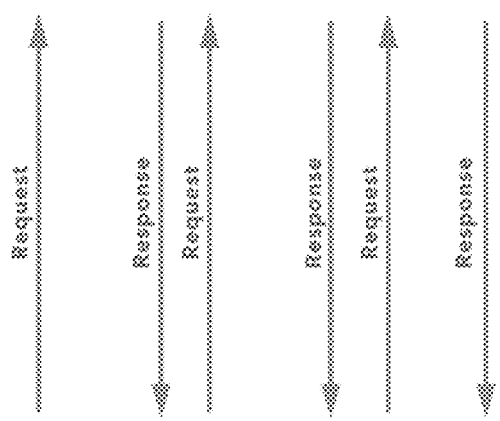
Figure 1:
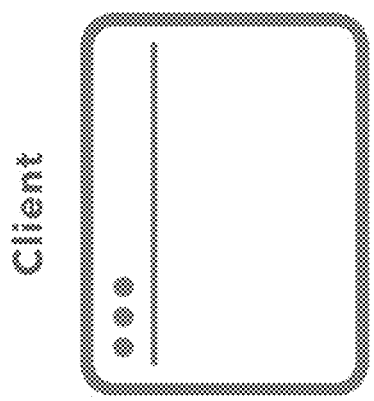

Described herein are techniques for suspending execution of an executing process, including through serializing execution state of the executing process. Through serializing the execution state, the execution state of the executing process can be converted to a byte string that can be output, such as by being transmitted to at least one entity and/or stored in at least one storage medium. In some embodiments, an executing process that has been suspended may be resumed, through deserializing the execution state. For example, in some embodiments, a byte string that is a serialized execution state of a suspended executing process may be deserialized to generate one or more data objects for the execution state of the suspended executing process, and a process may be configured with the data objects resulting from the deserializing. By configuring the process with the data objects resulting from the deserializing, the process may take on the execution state of the suspended executing process. The process may therefore resume execution for the original executing process.

Because the resumed process maintains the execution state of the original executing process, the resumed process may be considered to be a resumption of the original executing process that had been suspended, such that both the original suspended process and the resumed process may be considered to be the same process. In such a case, the original process and the resumed process may be different execution periods for the same process. In other embodiments, however, the resumed process may be a new process, such as a new process managed by the execution environment of the process. Where the execution environment is an operating system of a computing device, the resumed process may be a new process managed by the operating system that is different from the suspended process that had been managed by the operating system. Where the execution environment is a virtual machine, interpreter, or other environment, the new process and the suspended process may each be virtual processes, and in some cases may be different virtual processes.

For ease of description, in examples herein, the resumed process may be termed a "new" process. It should be appreciated, however, that embodiments are not necessarily limited to operating in embodiments in which the resumed process is wholly distinct from the original, suspended process.

In some embodiments, the executing process that is suspended may be an application that is part of a client/server system. For example, the executing process may be a server-side process that communicates with one or more client-side processes. The server-side process may be an instance of a server-side application of the client/server system, and the instance of the server-side application may be one of multiple instances of the server-side process that are executing in parallel, such as in a case where there are multiple client devices and/or users communicating with multiple server-side processes (one-to-one or in any other arrangement). In some embodiments in which a new process is launched following suspension of the original executing process, the new process may also be an instance of the server-side application. In embodiments in which there are multiple instances of the server-side application and in which the multiple instances are distributed across multiple execution environments (e.g., multiple server devices, multiple virtual machines, etc.), the original executing process that was suspended and the new process may be instantiated on different execution environments (e.g., different computing devices, different virtual machines, etc.). The serialized execution state of the original executing process may be deserialized and used to configure the execution state of the new process on the different execution environment.

As described herein, in some embodiments, the client/server system may be implemented as a request/response system. As discussed in further detail below, conventionally, a client/server system may be embodied as devices that communicate a series of messages between one another over time, without a necessarily stateful relationship between the communications in the series. In a request/response system, requests may be communicated between system elements over time, and related responses to the requests may be communicated between the system elements over time. For example, a client may over time communicate requests to the server, and over time the server may communicate responses to the requests. Each request may not necessarily prompt a response. This sequence of communications can be modeled as a state transducer on the server-side process, with each input (a request sent to the server-side process from a client) impacting state maintained by the state transducer and leading to zero or more outputs (responses sent by the server-side application). By modeling the series of client/server communications as a series of stateful communications in a request/response system, a state can be identified at any time for the series of requests/responses. This state is the state of a session between a pair of client and server-side process and for the communications exchanged between that pair of client and server-side process. The session state may be maintained in one or more data objects as a part of the execution state of the server-side process. In a case that the server-side is suspended in accordance with techniques described herein, the session state may be serialized along with other data of the execution state. Subsequently, the session state may be deserialized in accordance with techniques described herein, and used to configure session state (along with other elements of execution state) of a new process. In this manner, in a request/response system, the session state of a server-side process may be maintained across serialization.

Conventionally, once launched, processes are maintained in an executing state until terminated. During that time, regardless of whether the processes have tasks to perform, the processes may use system resources of the computing device on which the process is executing. For example, the processes may use memory (physical memory and/or virtual memory) of the system to store execution state of the process. In some cases, when the process is waiting to receive input (e.g., when a server-side process is waiting to receive input from a client), the process may use processing resources of the device, such as when the process is blocking waiting for input. This consumption of resources may impact other processes executing on the device, such as by preventing other processes from obtaining access to the processor for a time and/or restricting an amount of memory other processes may use. This may slow execution of other processes.

In some cases, computing platforms (e.g., cloud computing platforms) may limit the types of functionality that processes are permitted to execute on their platforms, to try to manage the resource consumption of processes and avoid processes have a large impact on one another (e.g., slowing one another down). For example, to avoid many simultaneously-executing processes using system resources "blocking" waiting for input, the platform may have prohibited blocking input operations from executing on their platforms. These restrictions on functionality imposed a burden on software developers, as the developers would need to write their software code in a way to accommodate these requirements of platforms on which users may want to execute the software.

The inventors recognized and appreciated that there might be a substantial benefit to suspending execution of a process, to prevent the process from using or tying up system resources at a time that the process is not actively performing tasks or is waiting for further input from a client or user.

The inventors further recognized and appreciated that there may be limitations to making a determination from outside of an executing process of whether the process is in a state that it can be suspended, as it may be difficult to determine from the outside whether a process has no tasks to perform and will not soon have tasks to perform, or whether the process is waiting for input from a client/user or not.

The inventors additionally recognized and appreciated that there may be limitations to suspending execution of a process, as an executing process may have stored a great deal of information during execution, and suspending execution of the process may lead to loss of that stored information. Loss of execution state would impact a process, as execution state may in many programs include information obtained earlier in execution that may impact what tasks are performed later in execution or impact how tasks are performed later in execution. Without the execution state, the process may have to start over execution at the beginning.

Conventional approaches have been proposed for suspending execution of a process, but also imposed significant restrictions on software developers as well as on computing platforms. For example, software developers may have been able in the past to include shortcuts in their code to allow jumps in execution, from a starting point of a process to a particular point in the code. This option may have been used in some cases in the past as an attempt at suspending a process. To do so, specific elements of data may have been written to persistent storage that would persist past termination of the process. The process could then be terminated. Later, the process could be restarted and the output data input to the new process. Added code within the process could read the input data (previously part of the execution state of the original process) and, based on an analysis of that data and evaluation of conditions, jump to particular points of execution in the code. The inventors recognized and appreciated, however, that this option imposed a significant burden on the software developer to add additional code to their application to output specific data to persistent storage, to analyze that data and evaluate it together with conditions, and dependent on the analysis/evaluation jump execution to particular areas within the code. This additional development burden presents significant disadvantages to this option. Other options were also available in terms of generating application "snapshots," but these options were limited to resuming execution of the snapshot process on the same computing device on which the process was originally executing. The inventors recognized and appreciated that limiting the resumption of the process to being on the same computing device limited ability to balance load of server-side processes within a distributed system of computing devices, such as in a cloud computing platform. In addition, these snapshots were generated by an outside process, which had limited information on whether the process was in a state that was amenable to suspension, or whether the process was due to receive user input and was to execute soon.

Against these factors, the inventors recognized and appreciated the advantages offered by techniques that enable an executing process to request that it be suspended. A developer creating the software code that drives the executing process, knowing the program flow of the process, may configure various points at which the process may be permitted to request that execution of the process be suspended. This avoids difficulties that would have been faced by requiring a determination be made outside the process of whether the process is eligible for suspension. In accordance with techniques described herein, not only could the process request suspension at this point, but the process could also be resumed at this point, avoiding the need for the developer to add complex code to analyze input and determine how and where to execute.

Accordingly, the inventors further recognized and appreciated the advantages of techniques that would be offered by storing execution state information for a process, for later retrieval when the process is to be resumed. In particular, the inventors recognized and appreciated the advantages offered by serialization in terms of maintaining execution state of the executing process. Through serialization, the data objects included in the execution state of an executing process may be converted to a byte string, and the byte string may be maintained for later deserialization when the suspended process is to be resumed. The compact representation of the execution state available through serialization may be stored and retrieved quickly, or may be communicated to at least one other entity. For example, if the process that is suspended is a process in a client/server system, the byte string may be communicated to the client. When the process is to be resumed, the byte string may be deserialized on a different device than the device on which the original process was executing, to generate execution state data objects reflected in the byte string. By performing the deserialization on another device, the system may be able to manage load between processes with more flexibility than conventional approaches.

Accordingly, described herein are techniques for suspending execution of an executing process, including through serializing an execution state of the executing process to a byte string. Subsequently, when the suspended process is to be resumed, the byte string may be deserialized to yield one or more data objects of the execution state of the suspended process, and a process may be configured with the data objects of the execution state, such that the process may resume execution with the execution state it possessed at the time of the suspension.

The inventors recognized and appreciated that techniques described herein may have particular advantages when used together with client/server systems, including with request/response systems. Some client/server systems, including some request/response systems, may have server-side processes that on occasion will be waiting to receive input/requests from a client. In addition, such a process may maintain and store a session state, including information indicating a history of request/response transactions between the process and a particular client device or user.

The execution state of a process for a request/response system may include the session state. In accordance with techniques described herein, when execution state of a process is serialized, one or more data objects storing a session state may also be serialized. Similarly, when a byte string is deserialized, the deserialization may yield one or more data objects that include the session state of the suspended process.

Techniques described herein may be used with a variety of execution environments, including computing devices and operating systems or virtual execution environments such as virtual machines or interpreters.

In some embodiments, a process that is suspended in accordance with techniques described herein may be a process that is maintained by an operating system of a computing device and to which the operating system assigns system resources. To distinguish "virtual" processes (described below), for ease of description, a process maintained by an operating system may be referred to herein as a "physical" process. In some such embodiments, when a physical process requests that it be suspended using techniques described herein, the process may be terminated, such that it is no longer a process maintained by the operating system and assigned resources are released. In some such embodiments, when the process is to be resumed, a new physical process may be launched by the operating system and may be configured with an execution state resulting from deserializing of the byte string that stores the execution state of the original, terminated process. During a time following termination of the physical process and before launch of the new physical process, In other embodiments, a process that may be suspended using techniques described herein may be a virtual process. A virtual process may be differentiated from a physical process in that a virtual process may not be maintained by an operating system or be assigned resources by an operating system. Rather, a virtual process may be executed within the context of a virtual execution environment. A virtual process may, in some embodiments, be executed within a virtual machine and/or interpreter, or any other form of management process that executes the virtual process. The management process (e.g., virtual machine or interpreter) may itself be implemented as one or more physical processes executing on a computing device. For example, a virtual machine may execute as at least one physical process that manages virtual processes of the virtual machine.

In some embodiments described herein, a management process is executed that instantiates a process, upon request serializes execution state of the process, and outputs a serialized byte string representing the execution state. The management process may also, upon request, deserialize a byte string to generate an execution state with which to configure a new process. In some embodiments, the processes may be virtual processes that are executed within the context of, and/or otherwise managed by, the management process. In such embodiments, the virtual process that is configured with the execution state resulting from the deserialization may be the same virtual process or a different virtual process.

Described below are various examples of implementations of techniques for serializing an execution state of a process and suspending execution of the process, and for deserializing the execution state and resuming execution of the process. It should be appreciated, however, that the examples provided below are merely illustrative. Embodiments are not limited to operating in accordance with any of the specific examples below.

Program Execution and Execution State

Various embodiments described herein relate to management of processes, and suspension and resumption of execution of processes. In some embodiments, the process may be an instance of execution of a program, such as an application. The process may be a single execution of the program, starting from the program's entry point, and the program may be a collection of code with a single entry point where a process executing the program begins execution. The program itself does not execute. The process(es) execute(s) the program.

When a process executes the instructions defined in a program (e.g., the executable code of the program), various data objects collectively known as the program execution state may be maintained for the process and associated with the process. These data objects may include program counters, call stacks, memory allocations and references, execution stacks, actively running threads, other information for a process context, and/or other information relevant to the ongoing execution of program instructions. Different execution environments may maintain different information in execution state, and embodiments are not limited to a particular execution environment. As such, it should be appreciated that embodiments are not limited to operating with particular execution states. The execution state may be stored in one or more data objects. As discussed in more detail below, information maintained within execution state may include one or more data objects storing a session state.

Because the execution state of the process is used in ongoing execution of the process, the execution state is maintained while the process executes. If, in accordance with techniques described herein, a process is to be suspended and then continued at a later time from the same execution point (rather than simply re-starting anew), it would be advantageous to maintain the process execution state during the period of suspension. By doing so, the process can continue in the state at which it was suspended.

For process suspension, it may be advantageous in some cases if the entire process execution state is serializable. As discussed below, if serializable, the execution state of a program may be serialized into a compact byte string, and then transmitted and stored on disk. When the program is ready to continue execution, the process can be re-instantiated by deserializing the execution state and continuing the process from where the process was suspended. As described below, it may be advantageous for the execution state data objects to be stored in a serializable manner. Examples of specific ways in which some execution environments may store execution state, including through specific data structures (e.g., the illustrative "Environment" data structure described below) are also described below.

It should be appreciated that embodiments are not limited to serializing an entirety of a process' execution state. In some cases, one or more elements of the execution state may not be serialized. For example, in some embodiments, a management process may be configured to distinguish between data objects included in the execution state that may not be needed upon resumption of execution and those data objects that may be needed, and serialize only those data objects that are needed. In some such embodiments, this may be a determination made based on the types of data objects maintained in execution state for a given execution environment, and the management process may be configured with information about data objects that are maintained for that execution environment that are not to be serialized. In other such embodiments, the management process may be configured with information on a program and information stored in an execution state for a particular program (e.g., in a session state for the program, or otherwise included in execution state) that is not to be serialized. In still other embodiments, the management process may analyze execution of a process to distinguish between elements of execution state that are to be serialized and elements of execution state that are not to be serialized. An example of such an analysis is described below in connection with global variables (including variables that are identified as constant and held to a constant value) and other global information, but it should be appreciated that other implementations of such an analysis are possible.

Client/Server Interactions and Session State

Client/server interactions can be performed using a request/response paradigm. In such a model, the client initiates a connection to the server and sends a request, and the server subsequently performs an action and sends a response to the client. Oftentimes, a single client may make a series of requests to a server. For example, for a banking application interaction, a client may send one request to authenticate the client, one request to retrieve the client's account balance, and so on.

A series of requests/responses between a client and a server may be called a session. A record of interactions in a session may be maintained as a session state. Session state (such as, in the banking example, whether the client is authenticated) may need to be persisted between requests in a session, and this state may affect how the server responds to future requests. To continue the banking application example, if the session state indicates the client is not yet authenticated, the server may not respond to the request for account balance or may prompt the client to authenticate; however, if the session state indicates the client has been authenticated, the server may respond with the account balance. Session state may include any relevant information about the current session's history, which may (or, in some sessions, may not) include elements of the history that may influence future responses throughout the client/server interaction.

The session state may be maintained in one or more data objects. Throughout a client/server interaction, when session state is maintained, it may be stored by the client and/or server, so it can be retrieved by components of the client or server that may use the session state to drive particular functionality of the interaction, such as by choosing which actions to perform or information to communicate based on session state. Ways in which session state may be stored include (but are not limited to):

1. A database or key-value store. In this case, session state may be retrieved using a session ID, like a ticket being used at a coat check to retrieve a coat. Here, the session state and the elements of the session state may be stored on the backend and be unknown to the client, which is only aware of the client's session ID.
2. A log of changes made to the session state. Session state at a point in time (including a state for a current time) may be reconstructed by processing the changes according to the log.
3. The current session state is cryptographically signed and encrypted by the server and sent to the client, to be attached to a future request sent by the client. This form of session management may be (somewhat erroneously) described as "stateless" because the backend does not store the information but rather relies on the client to send the state with each request as an additional parameter to that request. Cryptographic signatures and encryption may help to make this form of state management safe against some malicious attacks.

A single server, such as a single server process (or more abstractly, a service), may simultaneously engage in multiple separate sessions with unique clients. Each such session would have its own session state, which may reflect the unique sequence of requests/responses between client and server process.

Examples of Session State for Conversational Agents

Embodiments are not limited to operating with conversational agents or with any particular data or any particular exchange of communications. In some examples described herein, processes that are managed (including suspended) may relate to conversational agents. To provide context for and illustrative examples of the foregoing discussion of session state, an example is provided here of session state for conversational agents. It should be appreciated, however, that embodiments are not limited to implementation with conversational agents.

For some applications, session state may include a small number of key/value pairs (e.g., whether the client has authenticated, the user with which the session is associated, etc.). More complex applications, including some conversational agents (sometimes also known as "chatbots"), may capture more complex information in session state. This may include a log of messages exchanged so far in the conversation between the client and the conversational agent, which may be referred to as dialogue context. With some conversational agents, selection of responses from an agent may be based on more than just the most recent input/interaction and, in some cases, may be based on earlier messages and/or the entire conversation history. As one example, if early in a conversation a user's name is provided (e.g., volunteered by the user, or provided in response to a prompt), the conversational agent may incorporate the user's name into later messages it sends. As a more complex example, if the user is requesting help with performing a particular task, the task may be defined over the course of multiple messages from the user, such as in response to prompts from the conversational agent for further information relating to the task. As one example of such a task-building series of messages, the user may be seeking assistance with making a restaurant reservation, and there may be a series of messages relating to day, time, size of group, location of restaurant, type of restaurant, or other details. Multiple messages may therefore be used by the conversational agent in taking action, such as when information collected from multiple messages is incorporated into a task performed by the conversational agent or into a message sent by the conversational agent.

The entire interleaved list of requests and responses of a session with a conversational agent may be called a dialogue. As discussed immediately above, individual responses within the dialogue may depend not only on the requests that came before it, but also earlier requests, and/or any latent decisions or information retrieval that may have occurred while processing previous requests. The program may be responsible for mapping a current request and state from any/all previous requests/responses to a next response.

Examples of computational automata for implementing this mapping of requests to dialogues include finite state transducers (FSTs), decision trees, pushdown automata, and statistical models. These tools may be configured to drive responses conditioned on the session state that has been accumulated.

The mapping from requests to dialogue may also be computed by a computer program that employs blocking input/output (I/O). Blocking I/O is the ability of a process to be stalled awaiting the input of data. After the data is received, the process may continue and act on the received data.

In conventional blocking I/O, as discussed above, the process may be maintained as an executing process, and may consume resources of the execution environment while stalled. In accordance with techniques described herein, rather than stalling execution waiting for input, an executing process may be suspended. During a time that the process is suspended, the execution state (including session state, such as dialogue context) may be serialized to be maintained for when the process resumes executing.

State Transduction and Session-Specific Processes

While a server, in the context of a request/response application, may be treated as a collection of independent functions, stateless except for inputs passed in by the user and persistent storage indexed by input from the user, such a server may also be considered as a black-boxed state transducer. A state transducer is a model of computation mapping a time series of inputs to a time-series of outputs, also called relations. Between inputs, a state transducer may internally manage state, which may influence future outputs (such as in cases described above, where an output was based on more than one prior input).

In this model, a server would maintain for each client an execution of the state transducer, which would map the client's time series of inputs to the server to a corresponding series of outputs from the server. Thus, even in a case where the server is executing the same instructions for each client, each execution of this state transducer would be client-specific, based on the inputs and outputs exchanged.

This black-boxed state transducer may be implemented as a program with a single entry point. In accordance with techniques described herein, execution of the process may be suspended at specified locations in the program, before continuing to the next suspension. Consider the diagram of FIG. 1, showing an example of operations that may be performed by clients and servers in one illustrative embodiment. In this diagram, a server-side process receives a request from a client. While executing, the process may perform various operations and then computes and sends a response to the client.

In accordance with techniques described herein, in response to a request from the process to suspend execution, the process is suspended (see the first "pause" mark on the right, consisting of two vertical lines). When the process is suspended, its execution state may be serialized and output. Prior to or following suspension, a response to the request is provided to the client. As discussed below, in some embodiments, the serialized execution state of the process may be included in that response sent to the client.

After receiving a subsequent request from the client, the suspended process continues from where it left off (see the triangle "play" mark). This may include deserializing the execution state, which may have been included in the request in some embodiments. This process of request and response, and serialization and deserialization, repeats with a pause and a subsequent resumption following a new request, and may continue throughout execution of the process.

Under this model, each client's session may be represented by a unique execution of the program in a process, while the client's execution state (including session state) may be represented by the program execution state. As mentioned herein, it may be advantageous if the session state is serializable, as described below.

Serialization and Serializable Data Structures

In accordance with techniques described herein, it may be advantageous for execution state of a process, including a session state when a session state is maintained (e.g., when the process is executing in a request/response model), to be serializable.

A serializable data structure may be converted to and from a contiguous string of bytes. Such a string may be a "flat" array of the bytes, with one byte appended to the previous until all bytes are arranged one after the last. The string may not have a data organization apart from the array structure, and may not include fields for managing relationships between data. Such a string format may provide for easy storage and transmission of data.

When execution state (which may include a session state) is serialized into a byte string, the serialized string of bytes may contain the information that was included in the execution state, such as the type of each data object that had been included in the execution state (e.g., whether a data object was an integer or a float), and a value stored by each such data object. With that information, the byte string may be converted back into an execution state including each of the execution state data objects in the original representation. This process of converting a byte string back to an execution state is referred to herein as deserialization. When serialized, the data structure may not be considered usable by the program or application; once deserialized to its original representation, however, it may be used. The deserialized representation, therefore, may be considered as being in an actionable state. Not all data structures may be trivially serialized, as they may contain cyclic links or may be exceptionally large in size. JSON and XML are two common serialization formats.

While there may be advantages to using serializable data structures to maintain execution state, in some embodiments, execution state that does not easily serialize may be used when the execution state persists in RAM, such as when session state or other elements of execution state persist in RAM (e.g., between client/server requests). When persisting in RAM, a session state remains in its original, actionable state, and therefore does not have to be serialized for the purpose of storage. As discussed above, an advantage of some embodiments described herein is that when a process is resumed following suspension, in some environments, the process may be resumed on a different computing device or virtual machine than the one on which the process began execution. In embodiments in which at least some of the execution state is not serialized, the process may be serialized on the same device or virtual machine, which holds the non-serialized information in RAM. Alternatively, in such embodiments, the non-serialized data in RAM may be transferred between devices or virtual machines.

Interrupt Signal Handling

In some embodiments described herein, execution of a process may be interrupted if the executing environment (e.g., a CPU and/or operating system, a management process, a virtual machine, etc.) executes a special interruption instruction, such as at the request of the executing process to be suspended. During an interrupt, the executing environment may execute an interrupt handler, in place of whatever had been executing at the time the interrupt was received. Traditionally, an interrupt handler may be used to facilitate access to a device's hardware infrastructure, such as disk input/output or sending data over a network. Generally, interrupt handlers are implemented as part of an operating system's kernel. For processes being executed in connection with a management process operating in accordance with techniques described herein (e.g., within an interpreter or virtual machine, or other execution environment), interrupts may be issued by and handled by application code running in user space. As those skilled in the art will appreciate, user space is a partition of virtual memory, distinct from kernel space, that may be used by application code running on the operating system, distinct from kernel code.

Interrupts may be used in some embodiments as part of suspending operation of a process. FIG. 1 illustrates a process being paused during execution of the process. In each such case, in some embodiments, an interrupt is called by the process and the process is thereafter suspended (and its execution state serialized), when the process executes a particular instruction in the program. That instruction may be referred to herein in some examples as a "yield" operator. The yield operator, or other interrupt instruction, may trigger an interrupt which is handled by an interrupt handler running in the execution environment. This interruption handler may cause the process that triggered the interrupt to be suspended and its program execution state serialized. In some embodiments, the process may remain suspended until a condition is met, such as receipt of a new "request" input from a client.

Exemplary Computer System

FIG. 1 illustrates an example computer system 200 with which some embodiments may operate. Embodiments are not limited to operating with the system 200 of FIG. 1, as other environments are possible.

System 200 includes a computing device 202 that includes (and/or has access to) a data store 204, which may be arranged as any suitable data storage. For ease of illustration, device 202 is shown as a single computing device, but it should be appreciated that the device 202 may be implemented as any one or a combination of computing devices that may be operate alone or as a distributed system. In some embodiments, device 202 may be at least a part of a cloud computing platform. In addition, while FIG. 1 illustrates device 202 in the manner of a part of a desktop personal computer, it should be appreciated that this illustration is not limiting. Device 202 may be any suitable computing device, including a rack-mounted server or other device. Device 202 is configured to execute, and may execute, code to operate as a server in a client/server system, including in a request/response system, and therefore may be referred to herein as server 202.

In accordance with techniques described herein, server 202 may be executing a management process 206 that manages execution of one or more processes. In some embodiments, the management process 206 may be implemented as an interpreter and/or virtual machine that executes virtual processes within the context of the management process 206. The virtual processes may include processes 208, 208A that are each an instance of an application program. The application may be a server-side application of a client/server system. The two processes 208, 208A may each communicate with one or more clients, and may receive requests from the clients and provide, for each requests, zero or more responses to the requests, as discussed above. As shown in FIG. 1, each process 208, 208A may maintain data objects for execution states 210, 210A.

Embodiments are not limited to operating with any particular type of application or process, written in any particular manner. In some cases, though, the processes 208, 208A may each be implementations of an application that might be considered to have two starting points of the application. The first starting point may be program initiation, when the application first starts executing and initializes various variables and performs other tasks to configure itself for performing the tasks of the application. A second starting point of the application may be a session-specific entry point, where for each session with each respective client the application begins a series of interactions and builds a session state for that client. The application may similarly be considered to have two end points: a session-specific end point for each client, and a final execution point for the application as a whole.

In some such cases where an application has a discrete part that relates to interaction with a client in the context of a session with that client, the management process 206 may create the processes 208, 208A not for the application as a whole, but rather for that discrete session-specific part of the application. In some such cases, the management process 206 may execute the application and perform the initiation tasks, then may launch processes (including virtual processes) for each session-specific interaction with a client, which are the processes 208, 208A.

Execution state 210 (and 210A) may include various elements of execution state, including any of the examples described above. For example, the execution state 210 may include one or more program counters, call stacks, memory allocations and references, execution stacks, actively running threads, other information for a process context, and/or other information relevant to the ongoing execution of program instructions. In addition, the execution state 210 may include one or more data objects indicating a session state of a session between the process 208 and a client for that session. In accordance with techniques described herein, the data objects of the execution state, including of the session state, may be stored in a serializable manner, examples of which are described below. In some embodiments, as discussed below, the management process 206 may control creation of data objects for the execution state and manage the objects to make them serializable or more easily serializable.

FIG. 1 also illustrates that system 200 includes at least two clients 212, 214, each of which are respectively associated with users 212A, 214A. Embodiments are not limited to operating with clients associated with human users, nor to embodiments in which each human user is associated with a different client device. In some embodiments, each client device may be executing an instance of a client application for the client/server system of which the processes 208, 208A of a part. Accordingly, over time the clients 212, 214 may (e.g., in response to input from a user 212A, 214A) sends requests to one of the processes 208, 208A with which the client is associated (each client may be associated with a different process 208, 208A, or the clients 212, 214 may both be associated with the process 208). The processes 208, 208A may in turn send responses to the client 212, 214. The process 208 may maintain, as part of the execution state 210, a session state indicative of the history of request/response interactions for each client with which the process 208 communicates. The execution state 210 of FIG. 1 may be maintained for a session with the client 212.

System 200 further includes at least one communication network 218, which may be any one or more wired and/or wireless, local- and/or wide-area computer communication network, including the Internet. Embodiments are not limited to operating with any particular form of communication network.

In accordance with techniques described herein, the process 208 may execute an interrupt, such as a "yield" operation as described herein, that triggers suspension of the process 208 and serialization of the execution state 210 of the process 208. Upon execution of the interrupt, the management process 206 may suspend execution of the process 208 and may perform the serialization, as described in more detail below. The management process 206 may generate a byte string representing the execution state 210 as a result of the serialization. In some embodiments, the management process 206 may write that byte string to the data store 204. In a case that the byte string is written to the data store 204, as described in more detail below, the management process 206 may return to the client 212 a token or identifier indicating the execution state 210 that was serialized, to aid in subsequent retrieval from data store 204 of the byte string for the execution state 210. In other embodiments, the management process 206 may send the byte string to the client 212 with which the process 208 was associated, such as by including the byte string in a response including data generated by the process 208 for the client 212. Embodiments are not limited to storing the byte string or communicating the byte string in any particular manner.

Following serialization, the management process 206 may suspend execution of the process 208. The suspension may include termination of the process 208, such that the process 208 is no longer identified as an executing process within the execution environment. For example, records regarding the process 208 may be removed, resources allocated to the process 208 may be freed for allocation to other processes, and execution data objects for the process 208 may be deleted (as the values for those data objects are contained within the serialized byte string). In other embodiments, the management process 206 may free some or all resources allocated to the process 208 for use by other processes (e.g., deleting at least some of the execution state 210, since it was serialized to the byte string), but may maintain limited records that the process 208 is a process within the execution environment and may deschedule the process 208. Embodiments are not limited to any particular form of suspension.

In accordance with techniques described herein, the management process 206 may determine that a condition is met for deserialization of the execution state 210 from the byte string and resumption the process 208. As discussed above, in some embodiments the byte string may have been communicated to the client 212, and the condition for deserialization may be receiving a request from the client 212 that includes the serialized byte string. In other embodiments, the byte string may be written to the data store 204 and the client 212 may be sent a token or identifier for the execution state 210. In such a case, the condition for deserialization may be receipt of the token/identifier, which may prompt the management process 206 to retrieve the byte string from data store 204 using the token/identifier. Once the byte string is obtained by the management process, the management process deserializes the byte string, to yield data objects of the type indicated in the byte string and having values indicated by the byte string. The result of the deserialization is data objects of the execution state 210.

Once the execution state 210 has been deserialized, the management process 206 resumes execution of the process 208 using the execution state. In embodiments in which the process 208 was descheduled following freeing of resources allocated to the process 208, resources may be reassigned and the descheduled process 208 may be configured with the execution state 210 resulting from the deserialization. In embodiments in which the process 208 was terminated, the management process 206 may initiate a new process, such as a new instance of the server-side application. In such an embodiment, the management process 206 may configure the new process with the execution state 210 to create a resumed process 208. In either case, because the resumed process includes the execution state of the suspended process 208, the resumed process includes the characteristics and data of the suspended process 208, and therefore might be considered to be the same process (even if the original process was terminated). In embodiments in which the serialized byte string of the execution state 210 includes a program counter, the deserialized execution state 210, and thus the resumed process 208, will also include the program counter. As the program counter indicates the current instruction being executed, the resumed process 208 can resume execution at the same instruction that was being executed at the time it was suspended. Similarly, because the deserialized execution state 210 includes at least some of the session state from the suspended process 208, the resumed process 208 includes the session state and can use the session state in determining future responses to send to requests received from client 212, just as if the process 208 had not been suspended.

In some embodiments, when the process 208 is resumed by the management process 206, the process 208 may be resumed in a different execution environment than the one on which it was originally executing. For example, in the discussion above, process 208 was described as being managed by the management process 206, which may include executing as a virtual process within a virtual machine of the management process 206. In some embodiments, the system 200 may include multiple different instances of the management process 206, which may be multiple different virtual machines. In some such embodiments, when resumed, the process 208 may be executed within a different virtual machine of a different instance of the management process 206. This may include, in some cases, executing on a different physical computing device. For example, the different management process 206 (e.g., different virtual machine) may be executing on computing device 216, which is a different computing device than the device 216. In embodiments in which device 202 is a part of a distributed computing platform, such as a cloud computing platform, device 216 may be a part of the same platform, and load balancing processes may be used in determining whether process 208 is resumed on the device 202, the device 216, or another device. Any suitable load balancing process may be used in such embodiments, including known load balancing processes, as embodiments are not limited in this respect. In a case that the process 208 is resumed on device 216, and the serialized byte string had been stored to data store 204, the management process of device 216 may have access to and may obtain the byte string from the data store 204.

Accordingly, through the serialization and suspension provided by the management process 206 in accordance with techniques described herein, and the subsequent deserialization and resumption, an executing process may be paused and resumed to free resources that had been allocated to the executing process for allocation to other processes during a time of suspension, while enabling the suspended process to resume execution at a later time with the data and state it had prior to suspension. This can aid in ensuring resources are available for resources to execute and that processes that might otherwise be stalled (e.g., waiting for user input) can be instead suspended to make resources allocated to those processes available to other processes.

Described below are various examples of ways in which the functionality described above, such as of the management process 106 of FIG. 1, may be implemented.

Techniques for Serializing Execution State

As should be appreciated from the foregoing, described herein are techniques for augmenting the runtime of a process to support the serializing and deserializing of the execution state of processes. In some such embodiments, the programs for those processes may be written in an augmented programming language that provides support to the serializing and deserializing, as described below. It should be appreciated, however, that while this programming language may offer certain advantages in some contexts, embodiments are not limited to being implemented with programs written in this illustrative programming language or another particular programming language.

In addition, while the ability to serialize the execution state of a process has uses in request-response applications, including conversational agents, and examples are provided herein in connection with such applications/agents, it should be appreciated the ability may also be useful in other contexts, including distributed computing, resource management for operating systems, and many more contexts.

The runtimes of programming languages implemented in accordance with some techniques described herein may abstract-away many of the lower level aspects of memory allocation (e.g., virtual memory addresses) or other execution-specific details which may otherwise make serialization of the execution state of a process difficult or inefficient. This abstraction may be achieved by executing programs via virtual processes within a virtual machine or other virtual execution environment, which may be executed as a management process (e.g., management process 106 of FIG. 1). Some implementations of the techniques described herein may additionally provide various features, described herein, that enable developers to more easily manage session state in request/response applications.

Some techniques described herein may be implemented in programming languages that may then be used to implement programs that compute a mapping from requests to dialogue. For request/response applications, these programs may be deployed on a server to manage session state and map client requests to responses. Between requests, in accordance with techniques described herein, intermediate session state (e.g., the execution state of the virtual process that executes the program) may be serialized to and deserialized from a compact string of bytes, which may allow for these server-side processes to be suspended and resumed without maintaining execution state (including session state) in cache/RAM or otherwise in memory of the management process or other execution environment.

In some embodiments, to enable the serialization and deserialization of the execution state, the management process that manages execution of the process that may be suspended (such as by serving as the execution environment of the process that may be suspended) may maintain an Environment component. The Environment may encapsulate the execution state of a process that is an execution of a program. The Environment may be responsible for storing program counters and call stacks for the running threads, bookkeeping items such as the number of assembly instructions (clock cycles) executed, and other execution state information. The Environment may also include a serializable, execution-specific heap that stores program state. In accordance with techniques described herein, the Environment may be serialized to a compact byte-string representation and then deserialized so that the corresponding process can continue execution where it left off, after an arbitrary length of time. The Environment may contain the information that is used to resume execution of the original process after being suspended and serialized.

Figure 3A:
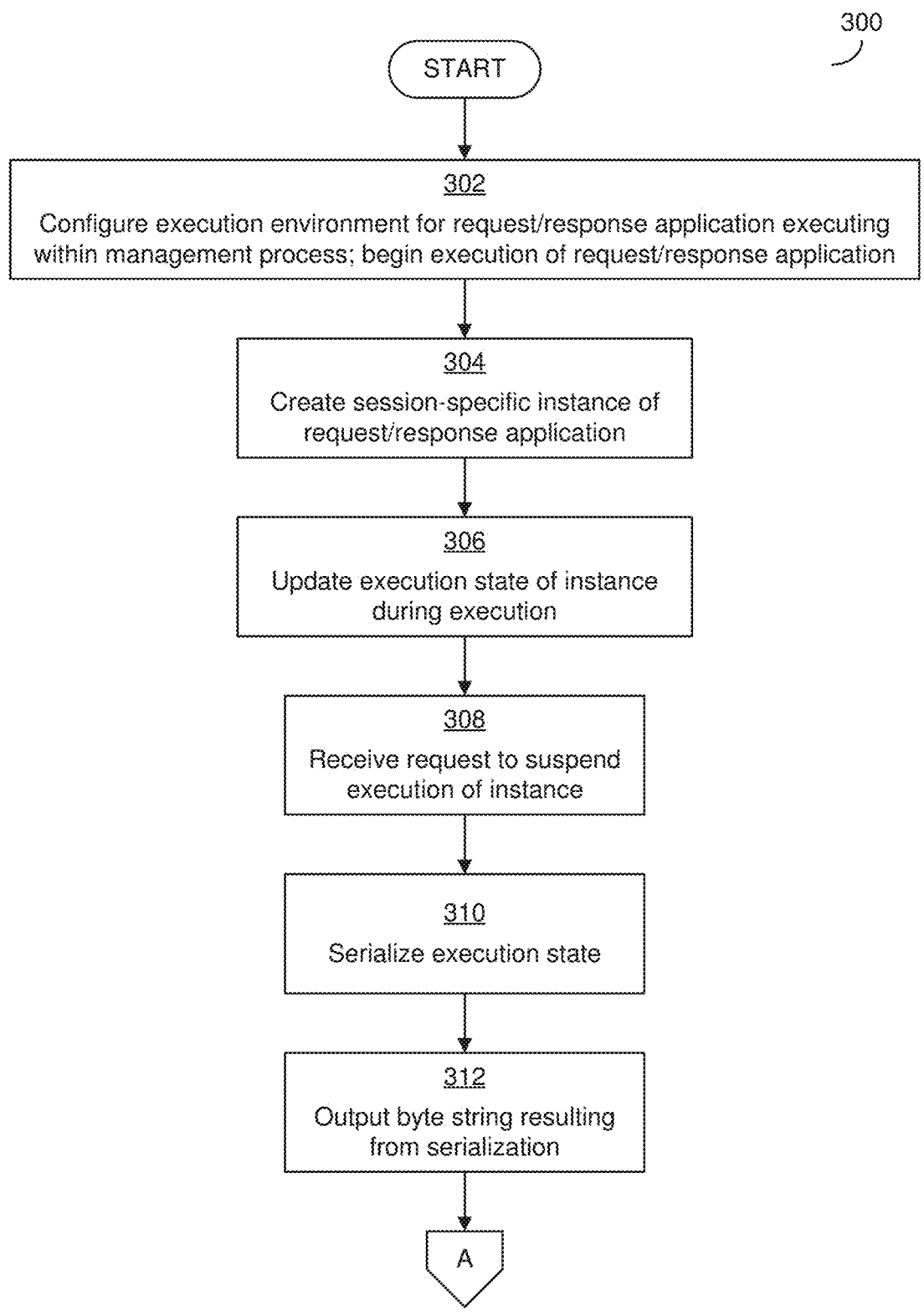
FIGS. 3A and 3B, is a flowchart of an illustrative process that may be implemented in some embodiments to manage execution of a process, including to suspend execution of a process and resume execution of the process.
Figure 3B:
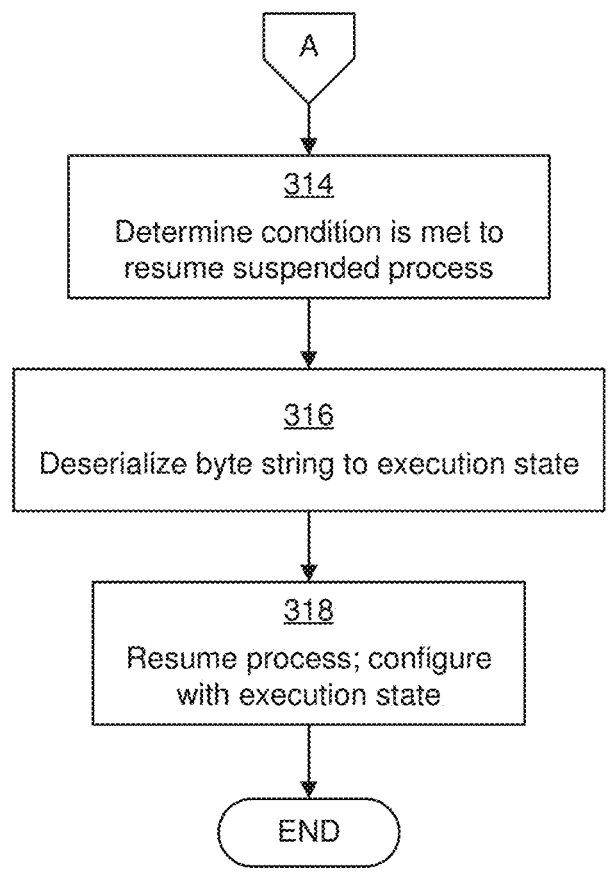

FIG. 3, consisting of FIGS. 3A-3B, illustrates an example of a process that may be implemented by a management process in some embodiments, for managing execution state of a process, for serializing that execution state, and for suspending the process, as well as for deserializing and resuming execution of the process. It should be appreciated that the process of FIG. 3 is merely illustrative, and that other processes may be used.

The process 300 of FIG. 3 may be implemented by a management process serving as an execution environment for one or more virtual processes. In some cases, the management process may be an interpreter that is executing applications written in a programming language that is being interpreted by the management process, but embodiments are not limited in this manner. In some embodiments, the management process may be implemented as a virtual machine, and may manage virtual processes within the virtual machine.

Prior to the start of the process 300, the management process is initiated on a device and begins executing.

In block 302, the management process configures its execution environment to provide to the management process inputs that are to be provided to instances of a request/response system. Such inputs may be received from a user interface, via a network from a remote client, and/or via any other input method, as embodiments are not limited in this respect. To configure the execution environment to receive inputs directed to instances of the request/response system, the management process may begin executing an instance of the request/response system. In the case that the request/response system is a client/server system, the instance that is executed may be an instance of a server-side application for the request/response system. As part of executing the initial instance of block 302, the management process may allocate various resources to the instance, including, for example, creation of network sockets or other resources for receipt of input. When creating the input resources for the instance, the management process may create instances of such input resources in its own execution environment, such that the management process may receive input received at a physical computing device on which the management process is executing. The management process may thereby configure the execution environment to provide to the management process input that is to be received at instances of the request/response system, such as from a user interface or network interface.

As part of the configuring of the execution environment and creation of the initial instance of block 302, the instance that is executed by the management process may perform various initialization tasks for the request/response application. These initialization tasks may include creation of global variables that may be used by the application across and between sessions with particular clients. Techniques for serialization that may account for these global variables are discussed in detail below.

In block 304, the management process creates a particular session-specific instance of the request/response application. This session-specific instance may be created prospectively, prior to receipt of input from a particular client, and be stalled waiting for a first input from a client. In some embodiments in which an instance is created prospectively, rather than stalling, in accordance with techniques described herein the created instance may be executed until its first request for suspension (at which point it is suspended, such as described in this FIG. 3). In other embodiments, instances may not be created prospectively, but may instead be created upon receiving a first request from a client, which triggers creation of a session specific to that client. Embodiments are not limited with respect to how a session-specific instance is first created. In accordance with some techniques described herein, when the management process creates this session-specific instance, the management process may create a new virtual process for the session-specific instance.

As discussed above, in some cases a program/application may be considered to have two starting points: an initialization starting point and an entry point at which it begins processing received input for a session. For some such programs, the management process may execute the program from the initialization starting point in block 302, and in block 304 may execute the session-specific process from the received input entry point.

In block 302, 304, the management process may initialize an Environment component for the program. The Environment component, as discussed above, may include execution state for the process. An Environment component may be initialized in block 302 together with the initialization of the application, and in block 304, when a process is created for a session-specific instance of the application, the management process may create a copy of the initialized Environment component that has, for example, global variables (and/or links to global variables) created during the initialization of the application.

In block 306, the management process updates the Environment during execution of the process, as the process updates the execution state (including session state) in accordance with received input and tasks performed by the process. For example, program-counters and call stacks for running threads are updated upon the execution of each program instruction. The Environment may include the heap, and in such a case any memory allocations, references, function declarations, etc. may be updated accordingly.

In block 308, during execution of the process, the management process receives a signal that the process has signaled that it is to be suspended. For example, the management process may receive an interrupt from the process, when the process executes a particular operation.

In some embodiments, indicating that a process is ready to be suspended and serialized may be carried out using a "yield" operator. The yield operator may be called from a process' call stack. This yield operator, when called, may behave similarly to blocking I/O, except that in response to this operation the process execution state is serialized and subsequently written to disk or transmitted. Because it may be called from various places, or anywhere, in the call stack, the yield operator may allow for the architecting of complex abstractions through functional programming. For example, in a conversational agent application, a "get_confirmation" function may be written that instructs the process to be suspended and serialized in anticipation of input from the client. Without the yield function, this functionality could involve blocking or stalling execution, and using resources of the execution environment, until the input/request is received from the client. With the operator, execution can be suspended and resources freed during that waiting period. In addition, the "yield" operator could be placed inside the "get_confirmation" function, such that the caller of the "get_confirmation" function need not concern itself with how many messages are exchanged, with the yield operator, or with how many times the process is suspended. The caller may instead simply call the "get_confirmation" function and then only be concerned with the end answer: a response from that function with a Boolean value conveying the "yes" or "no" received from the client. The power of the yield operator may therefore be the ability to suspend the program execution, wait for additional input, and resume the program execution at the location of the call to "yield," which may allow for complex blocking I/O logic associated with request/response communication to be abstracted away, with the unique benefit of not having to maintain execution state in cache/RAM during periods of suspension.

In block 310, in response to receiving the signal (e.g., via the yield operator, or through another mechanism) that a process is to be suspended, the management process serializes the Environment for that virtual process. Through the serialization, the Environment is converted to a byte-string format (e.g., JSON, XML, or Protocol Buffers), easily capable of being transmitted or stored on disk.

In some embodiments, the management process may maintain the Environment with an execution-specific heap, which is itself serializable. In conventional implementations of heaps in conventional programming languages (e.g., C, C++, Python, etc.), serialization of a heap would be difficult or inefficient due to the under-utilization and fragmentation of allocated virtual memory. While serialization might be achieved, the representation may not be compact, and the copying of virtual memory pages or extraction of the data stored therein may be inefficient, difficult, and computationally expensive. To enable the heap of the Environment to be more compactly serializable to a compact byte-string format, in some embodiments the management process (acting as the execution environment for the process to be suspended) may provide its own abstract representation of memory allocation. In this scenario, memory address space used by the heap may be specific to the virtual process that is executing the process rather than being specific to the actual host machine. These virtual process-specific memory address spaces may be allocated by the virtual machine, as opposed to the host machine's operating system.

Some forms of process-specific allocation of memory address space may have several advantages related to serializability, in some embodiments. Due to a lack of a direct mapping to the underlying hardware memory layout, individual memory chunks may be of arbitrary size and also resized at any time. As a result, with such allocations, data structures stored within these memory chunks may be able to be resized without concern for the complexity associated with dynamically allocating fixed-with memory chunks to accommodate memory needs. This is in contrast to conventional implementations of programming languages, that possess a direct mapping to the underlying memory layout and may be limited by such a concern. This allows the management process to allocate only address space that is needed. As such, the size of the heap may equal the size of its data. In contrast, with conventional implementation of programming languages in which memory chunks are fixed-width, allocations of memory address space are often underutilized and fragmented for the purpose of computational efficiency.

Another technique that may be used in some embodiments to aid in serialization of the heap into a compact representation is for the primitive and built-in types of a programming language (e.g., integers, floats, strings, Booleans, nil, maps, lists, tuples, etc.) to have virtual functions that contain procedures for compactly serializing and deserializing them. For example, each serialization function may create a byte string that includes a byte prefix indicating the type of data, following by a byte string with the value of the data. Each data type may have its own prefix, such as the binary bit strings Ob000 for integers, Ob001 for strings, Ob010 for objects, Ob011 for arrays, Ob100 for references, and so on. Following each type prefix, the byte string for each data object may include values for the data. For a string, for example, the type prefix Ob001 may be following by the string value itself encoded in UTF8 and followed by a null terminator. For a reference to another data object in the execution state (discussed in more detail below), the type prefix Ob100 may be followed by a number identifier for the reference (as discussed below) encoded as a 64-bit little endian integer. For complex objects or data types that may include other data objects (e.g., custom data classes), the type prefix Ob010 may be following by a series of references to attribute/value pairs, where the attribute is a reference to a string and the value is a reference to the object assigned as the value of the attribute, as well as a reference identifier for the class or type of the object.

As other data types that may be included in session state or otherwise in execution state of a virtual process may be represented as a composition of these primitive and built-in types, other data structures may become serializable to compact representations through the use of these procedures for the primitive and built-in data types. Namely, the more complex data types may be serialized by serializing the primitive and built-in data types from which the complex data types are assembled.

These virtual functions may be provided by the management process, and called by the virtual process during serialization and deserialization of the heap. During serialization, data sub-structures and primitives stored in the heap may be serialized to compact representations.

In some cases, some data objects of an execution state of a process may reference once another, such as in a case that one data object includes in a field of that object a reference to another data object, such as a reference to virtual memory address of that other data object. Such cross-references between data objects can limit the ability of a data object to be serialized. Accordingly, in some embodiments in which data objects contain cross-references, the cross-references may be resolved and replaced prior to serialization. For example, each of the data objects of an execution state, including of a session state, may be indexed prior to serialization, such that each data object is assigned an identifier. The identifier may be an integer. An array may be constructed that relates data objects to identifiers. Each cross-reference in data object to another data object of the execution state may then be replaced with the identifier for the referenced data object. In this way, dynamic cross-references between objects may be replaced with fixed values in the form of the identifiers from the index, resulting in serializable structures. Accordingly, before serialization, any references stored in the heap may be resolved with memory addresses, resulting in an acyclic, flat data structure. The array containing the indices is then serialized along with the other data of the execution state, for use in deserialization.

This indexing functionality may be performed as part of the serialization, even in a case that the execution state does not include cross-references. At a start of the serialization, data objects of the execution state may be indexed. Starting from the highest-level process data structures (e.g., in some execution environments, actively running threads and associated frame stacks), the management process may recursively enumerate and add to the index all reachable data objects of the execution state that are in the same connected component as the top level objects. This may be considered a depth-first enumeration of each data object, starting with the top-level objects and pursuing each reference to other data objects. Once all data objects below one top-level object have been enumerated and indexed, the process may be repeated for any next top-level object, until all reachable data objects of the execution state have been enumerated and indexed. The identified data objects may then each be serialized, as discussed above.

While in the foregoing example, all data objects of execution state are identified and then serialized, it should be appreciated that embodiments are not limited to serializing all data objects included within execution state. Examples are described below of distinguishing between global and non-global data objects, and refraining from serializing global data objects. Other embodiments are possible in which a management process is configured to select data objects of execution state that are not needed to persist through suspension, and to refrain from serializing such data objects.

The ability to serialize non-primitive data structures using a combination of primitives, coupled with the high utilization of allocated memory, may allow the heap to be serialized to a highly compact byte-string representation, which may be easily stored or transmitted. Accordingly, in block 310, and once the internal references are resolved, and using the serialization functions for each data type, the management process converts the Environment for the process to be suspended to a byte string format.

Once the management process generates the byte string in block 310, the byte string is output by the management process in block 312. The output of block 312 may include storing the byte string to a data store (e.g., data store 104 of FIG. 1). In such a case, the management process may assign the byte string an identifier, such as a token. The identifier may then be communicated to an entity that is associated with the suspended process, such as a client that is associated with the suspended process. The identifier may be communicated in any suitable manner, as embodiments are not limited in this respect. In some embodiments, a process may be suspended as part of preparing a response to be sent to a client, in response to receipt of a prior request. In such embodiments, the response to be sent to the client may be queued for output by the management process. The identifier may be added to the response, and communicated to the client. As discussed below, in such embodiments, the identifier may be included in subsequent requests from the client, to aid the management process in retrieving the correct execution state (i.e., the correct byte string) from the storage.

In other embodiments, rather than writing the byte string to a data store, the byte string may be output to an entity associated with the suspended process, such as a client associated with the suspended process. As discussed immediately above in connection with including an identifier in a communicated response, in some embodiments, when the management process has a response queued for transmission to a client, the byte string resulting from the serialization may be added to the response. In some embodiments, when the byte string is added to the response, the response and/or byte string may be secured. For example, the response and/or byte string may be encrypted, or the response and/or byte string may be cryptographically signed, or another security technique may be used. Subsequently, when the client sends a new request, the byte string may be included in the request.

Following output of the byte string in block 312, activity with respect to the suspended process is paused.

Subsequently, in block 314, the management process determines that a condition is met for resumption of the suspended process. Embodiments are not limited to using any particular condition. In some embodiments that operate with request/response systems, the management process may use as a condition receipt from a client of a new request intended to be processed by the virtual process that was suspended. In response to receipt of that new request, the management process resumes execution of the virtual process, to perform operations on the request and to potentially produce one or more responses. The request may include, as discussed above, an identifier for the suspended process (and/or for the serialized byte string) and/or may include the serialized byte string. In a case that the request includes the identifier, the management process obtains the byte string for the suspended process from a data store using the identifier.

In block 316, the management process deserializes the byte string, based on the type prefixes and values of the byte string as well as the index created during serialization that is included in the byte string. The management process scans the byte string, allocating memory for each identified object based on its type prefix and editing the index (or creating a new index) to indicate a location in memory of the new data objects that correspond to the data objects listed in the index. For each created data object, the value indicated by the byte string for the object is inserted into the object (e.g., when the byte string includes a type prefix for an integer and a value for the integer, the management process created an integer object in memory and stores that value in the integer object). When a data object in the byte string is indicated to include a reference to another data object, when the management process creates that data object in memory, the management process replaces the identifier for the other data object (that had been created during serialization) with the memory location of the newly-recreated referenced data object. In a case that a particular complex class or object type was serialized through serialization of primitives contained within the class as well as a reference to the class type, a class of the referenced type may be created (e.g., through a class constructor provided by the application) and configured with the values indicated by the byte string. In this way, the management process recreates in memory each of the original data objects that had been included in the execution state of the process prior to suspension.

In cases in which the condition that triggers resumption of a process is receipt of new input (e.g., from a user interface, a client, etc.), the management process may be configured to make that new input available to the process upon resumption of the process. Accordingly, in addition to recreating the execution state through the deserializing, in some embodiments the management process may further edit the execution state to add the new input received from the client. For example, in some embodiments, the management process may add the new input to the execution stack of the most recent frame of the main thread of the process. As another example, in some embodiments, new input may be added to a particular variable of the execution state, from which the process is configured to obtain new input. Other techniques may be used to provide the new input to the process.

As a result of the deserializing of block 316, the management process recreates each of the elements of execution state (including session state) that had been included in the byte string, and thereby produces the execution state of the suspended process. In block 318, the management process resumes execution of the suspended process using the execution state that results from the deserialization. For example, if the management process descheduled the process at the time it was suspended, the management process may schedule the process and configure the process to access in memory the data objects of the recreated execution state. As another example, if the process that was suspended was terminated, the management process may trigger creation of a new process in the execution environment and configures that process to access in memory the data objects of the recreated execution state. In this way, the resumed process continues execution in the same manner as it was prior to suspension, including with the same program counters, call stacks, and other execution context information.

Once the process resumes executing, the process 300 ends.

In examples described above, an execution state was described as maintaining one session state for a particular client. Some embodiments may not be limited in this manner. For example, in some embodiments, a server-side process may maintain, for a given client, potentially multiple session states.

For example, programming languages implemented in accordance to techniques described herein that may be used to implement conversational agents may additionally manage execution state so as to include support for a style of thread called a conversational thread. Conversational threads are distinct from the conventional processing threads, because only one conversational thread may be executed at any given time. The advantages of conversational threads are not in parallelization for performance gains, but rather in separating topics during complex client interactions. As a high level example, imagine two people are walking down the street on the way to lunch talking about work. Only one of the people knows the way to the lunch spot. The conversation about work might be interrupted at times by a side conversation about directions with questions like, "It's the next left, right?"

"Yep."

Conversational threads may fill a similar need; each thread may be used to carry on a separate conversation in the context of a conversational agent application.

In some such embodiments that support conversational threads for conversational agents, a session state may be maintained for each conversational thread. In some such embodiments, only one conversational thread may be active at a time. In some embodiments, each conversational thread may be a virtual process, and the non-active virtual processes may be suspended in accordance with techniques described herein. In such embodiments, when an input request is received from a client, the request may be evaluated by the management process to determine the conversational thread to which the input relates. The management process may make this determination in any suitable manner, as embodiments are not limited in this respect. For example, the management process may compare content of the new input request to content of the various conversational threads, to generate a confidence level of a match to each of the conversational threads, and select the thread with the highest confidence level of match. Conversational threads that are not chosen remain in a suspended state, and may wait for a next client request. As an illustrative example of the behavior that conversational threads support, imagine a customer service desk at a grocery store where there are three people: one specializing in produce, one in meat, and one in dry goods. If someone comes in complaining that the apples they bought were rotten, the employee specializing in produce may naturally self-nominate to handle the complaint. Conversational threads may be thought of as replicating this sort of behavior.

Global Data Objects

In some embodiments, techniques may be used to more efficiently serialize an execution state of a process, including the heap of a process to be suspended, by serializing only some data within an execution state. In some embodiments, a management process distinguishes an execution state between local and global components of the execution state. In the case that a process to be suspended is an instance of an application that may be replicated across multiple instances, such as a server-side process that may execute multiple times in parallel, such as one instance for each client, there may be elements of execution state that are identical between instances. That data that is identical across two or more, or all, instances may be referred to herein as "global" data, in contrast to "local" data that may be specific to a particular instance. It may be advantageous in some cases to avoid serializing global data, to reduce the processing needed for serialization and deserialization and to reduce the storage needed for a byte string resulting from serialization.

In some embodiments, a management process that is managing execution state for a process may partition the execution heap between a local heap and a global heap. The local heap may store execution-specific data, while the global heap may represent a write-once (per key) key-value store with its own address space shared by multiple instances of the application. That is, in some cases, data stored in the global heap may be considered constant and therefore not tied to the execution of a program. There may be references within the local heap to the global heap, but there may not be references within the global heap back to the local heap.

The data objects of the execution state may be separated between the two heaps in various ways.

In some embodiments, for example, a software developer may define in code that a particular data object for an application is a global data object that does not vary between instances, or that a particular data object is a local data object that could or does vary between instances. To do so, the software developer may tag a data object when it is defined in the code or at any other suitable point in the code. The management process, when such an application is executing, may receive requests to allocate memory for a data object in response to the definitions in the code, and may receive the tags as part of that allocation request. The management process may assign a variable or other data object with a global tag to the global heap and a variable or other data object with a local tag to the local heap.

Additionally or alternatively, in some embodiments, the management process may assign variables or other data objects to the global heap or to the local heap based on the execution point at which the variable or other data object is defined and/or last modified in a process. As discussed above, some applications may be considered to have two starting points: a starting point for the application as a whole after which some initialization tasks are performed, and an entry point for a session that may be considered to be when a session-specific instance of an application is started. In some such embodiments, the management process may identify any variables or other data objects created or last modified after the first starting point but before the second starting point (session entry point) as global objects, and allocate them in the global heap. The management process may also identify any variables or other data objects created after the second starting point (session entry point), during a session-specific instance, to be local objects and allocate them in the local heap.

Additionally or alternatively, in some embodiments, the management process may monitor execution of a number of instances of an application over time, and identify data objects that do not change between the different instances. If the management process identifies over time that a particular data object is immutable across all instances of an application, then the management process may identify that data object as a global data object and allocate that data object in future instances to a global heap.

In some embodiments that operate with such a partition of the heap, the information stored in the global heap is not execution-specific and only the local heap may need to be serialized. The purpose of partitioning the heap is to decrease the size of the serialized representation, so that it may be more easily stored or transmitted. For example, some top-level functions or data objects may not be execution-specific and therefore may be stored in the global heap. When serializing, during an indexing of the data objects of the execution state, the management process may identify whether a particular data object is a local object or a global object, and refrain from serializing global objects. In some such embodiments, a global object may be assigned an identifier, such as an identifier assigned to other data objects that are to be serialized. During serialization, any references in other data objects to a global object may be replaced with an identifier for the global object, similar to the functionality described above for replacing cross-references with identifiers. However, while the identifier is inserted in place of the reference, the global data object may not be serialized. Subsequently, during deserialization, an identifier for a global object may be replaced with a reference to the memory location for the global object, just as with local objects as described above.

While examples have been described in which a management process actively divides data objects into two different heaps, it should be appreciated that embodiments are not so limited. In some embodiments, the management process may not distinguish between heaps, but may track whether data objects are global or local, such as through metadata or other information describing data objects. Subsequently, that information may be used by the management process to determine whether to serialize particular objects. Accordingly, it should be appreciated that the embodiments that include distinguishing between global and local objects during serialization are not limited to also partitioning a heap or otherwise limited to distinguishing global and local objects in any particular manner.

Detailed Discussion of Illustrative Implementation

As an illustrative example of a programming language that is implemented in accordance with the techniques described herein, an example is described below that is referred to as "ChatLISP" herein. ChatLISP is a Turing-complete scripting language. This discussion is meant to provide an example that aids in the understanding of potential implementations of the techniques described herein, but it should be appreciated that embodiments are not limited to operating with or in the manner of ChatLISP or to the use of techniques herein for request-response applications, including conversational agents.

ChatLISP is a serializable Turing-complete scripting language for handling complex session state in applications that adhere to the request-response paradigm. ChatLISP consists of a LISP-based language (front-end), a compiler, and a virtual machine for executing ChatLISP programs via virtual processes. The compiler converts scripts written in ChatLISP into a stack-based assembly language, which is then executed within the virtual machine. Virtual processes that execute ChatLISP programs are capable of being suspended and serialized through the use of a built-in "yield" operator. The ChatLISP virtual machine provides virtual process-specific memory allocation, while virtual processes are equipped with the abilities to perform garbage collection, heap partitioning, threads, and manage elements of one or more execution states (and/or session states) to be maintained, such as for one or more conversational threads.

Compilation of a ChatLISP program begins by parsing the source code into a parse tree according to a well-defined grammar, also known as a Parsing Expression Grammar (PEG). The parse tree maintains all information of the source code, while additionally demonstrating the program's execution flow via its nested tree structure. For example, the various nodes and branches of the parse tree may convey individual expressions, arguments, and other meta information. The parse tree is then consolidated into an abstract syntax tree (AST). The AST provides a more abstract representation of the program such that not all information from the source code is preserved. Each node in an AST represents an expression, while a node's children represent arguments to those expressions. The leaves of the AST are typically literals or symbols. As the final steps in the complication process, the AST is flattened, may in some embodiments be converted to a control flow graph (CFG), and is converted to a stack-based assembly language called ChatAssembly.

When a virtual process executes ChatAssembly, it makes use of an Execution Stack for enqueuing parameters and performing operations. This is done using Postfix Notation, characterized by the pushing of arguments on to the Execution Stack, followed by the execution of an operator. The following example illustrates some assembly code using postfix notation to add 2 numbers:

PUSH 1
PUSH 5
OP+2

Here, the value, 1, is pushed onto the Execution Stack, followed by the value, 5. Then, the + operator is performed, where the 2 argument indicates that the last two arguments are being added. After execution of this simple program the Execution Stack would simply contain the value, 6, because the arguments to the + operator are popped from the stack and the result of the operation is then pushed onto the stack.

The ChatLISP front-end supports built-in operators for conditional branching, looping, arithmetic, Boolean logic, arrays, slices, maps, function calls, and more. The ChatLISP front-end also supports a yield operator, which allows the virtual process to be suspended, and its execution state serialized to a compact byte-string representation. When a ChatLISP program yields, it may specify responses that are to be sent back the client. These responses can be computed within the ChatLISP program, and enqueued by appending them to a built-in Bundle object before calling the yield operator.

A ChatLISP virtual process consists of a central component called the Env (short for Environment). The Env encapsulates the execution state of a single execution of a ChatLISP program. Among the main items the Env is responsible for storing are (1) elements of one or more states, such as one or more conversational threads, (2) an execution specific local heap for storing state, and (3) a number of assembly instructions (clock cycles) executed. Each thread contains a number of items relevant to the execution of that thread. These items include:
1. A program counter containing the assembly instruction number the thread will execute next.
2. An execution-stack containing literals and heap references, used by the stack-based assembly instructions for enqueuing parameters to be consumed by operators and functions.
3. A pointer to a call-stack (stored in the heap) which contains return pointers for function calls in the current stack trace. Each time a function is called, the return pointer (the assembly number of the instruction immediately succeeding the CALLFN instruction) is pushed onto the call-stack. When a function exits, the program counter is set to the last return pointer and the return pointer is popped from the call-stack.
4. A pointer to a scope-stack (stored in the heap) which contains a stack of symbol—bindings—binding symbols to the locations in the heap in which their values are stored. Each time a new scope is entered, it is pushed onto the scope-stack. This occurs when calling a function or when calling the scope operator.
5. The last clock cycle at which the thread was executed As mentioned previously, the ChatLISP virtual machine provides virtual process-specific memory allocation. Having no direct mapping to the physical hardware memory layout, the memory chunks stored within these memory address may be of arbitrary size and also resized at any time to accommodate the insertion and removal of data. The high utilization of memory address space allows the heap to be serialized to a compact byte string.

A ChatLISP virtual process uses two separate heaps: local and global. The local heap is execution-specific, while the global heap is write-once and then read-only, meant to store information that can be shared among individual executions of a ChatLISP program, as outlined in Section 5. The two heaps share an address space but assign addresses in two disjoint subspaces: for example, the local heap may assign addresses in the range 0x0000000000000000 to 0x7FFFFFFFFFFFFFFF while the global heap may assign addresses in the range 0x8000000000000000 to 0xFFFFFFFFFFFFFFFF. In other words, the highest order bit of the address may be used to specify whether the reference pertains to the local or global heap.

Garbage collection of the heap is handled via depth-first search of the reference graph: any address allocated in the local heap which is unreachable starting from references in each of the threads is no longer relevant and deallocated. Garbage collection is typically performed every time the virtual process is suspended and serialized to minimize the size of the serialized execution state. Garbage collection can be configured to occur at a regular interval in terms of clock cycles; this could be advantageous for programs with a significant number of heap allocations between requests, or without an upper bound for the number of heap allocations between requests.

The conversational threads used in ChatLISP are based on the ones described in Section 5. Upon receiving a request from the client after a period of suspension, these conversational threads may bid on their confidence that they should execute next. These bids may be conditioned on the content of the clients requests. For example, a conversational thread may submit as its bid the probability of a particular intent as determined by an intent recognizer that processed the client's request. In the event of a tie between the highest bids, the thread which executed most recently is selected to execute next.

The full process for executing a ChatLISP program is as follows:
1. The program is compiled from ChatLISP source code to ChatAssembly.

4. For each new client connection, a new Env is created, and execution begins via a virtual process inside the ChatLISP virtual machine.
5. For each Env, for each clock-cycle, a step function is called, effectively performing a single instruction of ChatAssembly. The information encapsulated within the Env is updated accordingly.
6. The step function returns any signals, including exceptions and yields, to inform the virtual machine if the process has experienced a fatal error or has yielded and is ready to be suspended.
7. If yielding, the virtual process will suspend execution (including, if there are multiple threads, of all active threads) and serialize the Env. The virtual machine will then send a response to the client, as determined by the content of the Bundle object, which was computed within the ChatLISP program before the call to yield.
8. When new input is received from the client, the serialized Env is deserialized and the input is stored inside a variable for consumption by the program. Execution then continues within the virtual process via successive calls to the step function.

Figure 4:
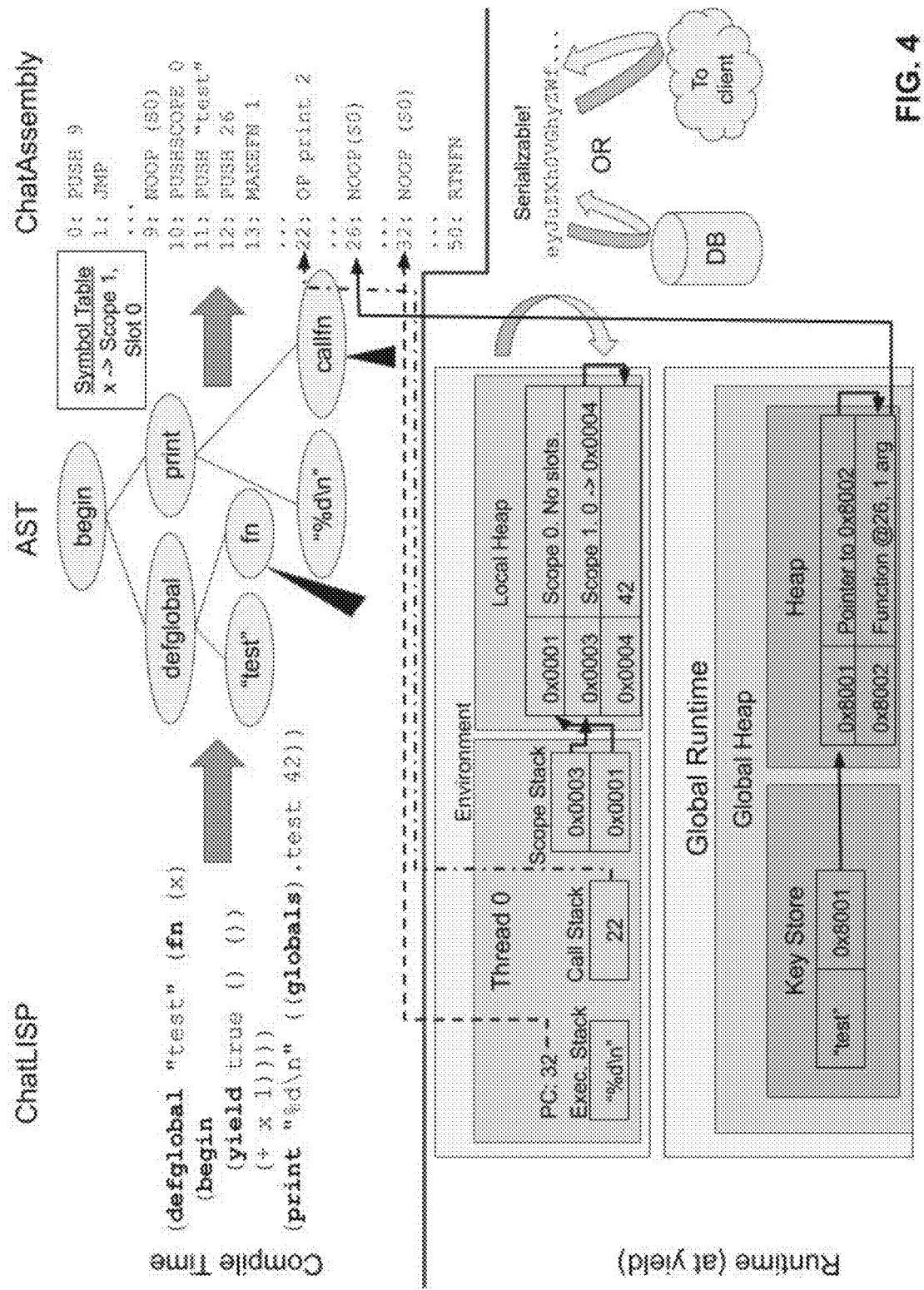
FIG. 4 is a sketch of components of an illustrative implementation of techniques described herein.

FIG. 4 demonstrates the core components of a simple single-threaded ChatLISP program, including the source code, AST, ChatAssembly, and a snapshot of the Env (Environment) during execution.

Examples of Computer Implementation

Techniques operating according to the principles described herein may be implemented in any suitable manner. Included in the discussion above are a series of flow charts showing the steps and acts of various methods for suspending execution of a process, including for serializing and deserializing execution state of a suspended process. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 506 of FIG. 5 described below (i.e., as a portion of a computing device 500) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 2:
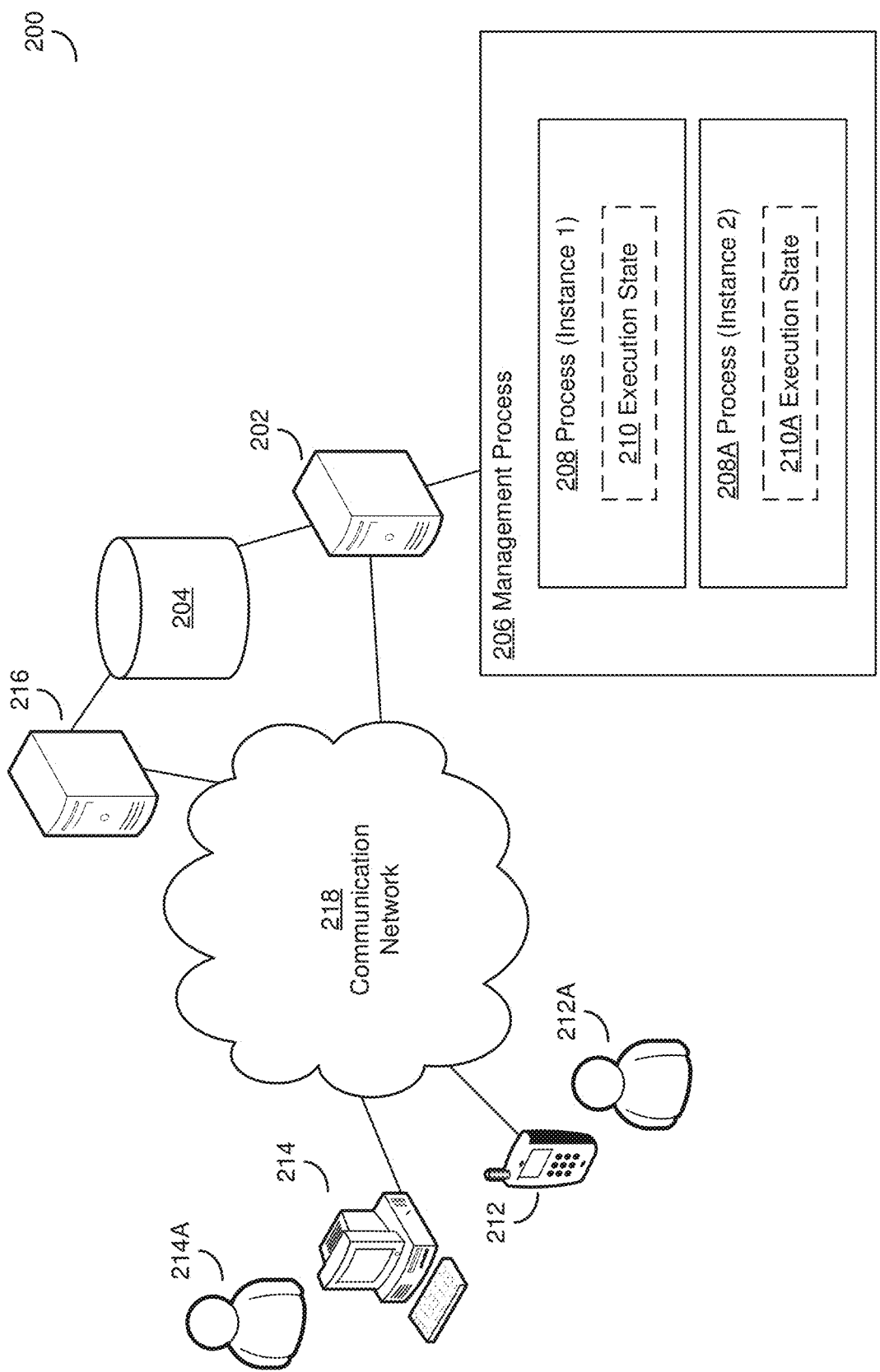
FIG. 2 is a sketch of a computer system with which some embodiments may operate.

In some, but not all, implementations in which the techniques may be embodied as computer-executable instructions, these instructions may be executed on one or more suitable computing device(s) operating in any suitable computer system, including the exemplary computer system of FIG. 2, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 5:
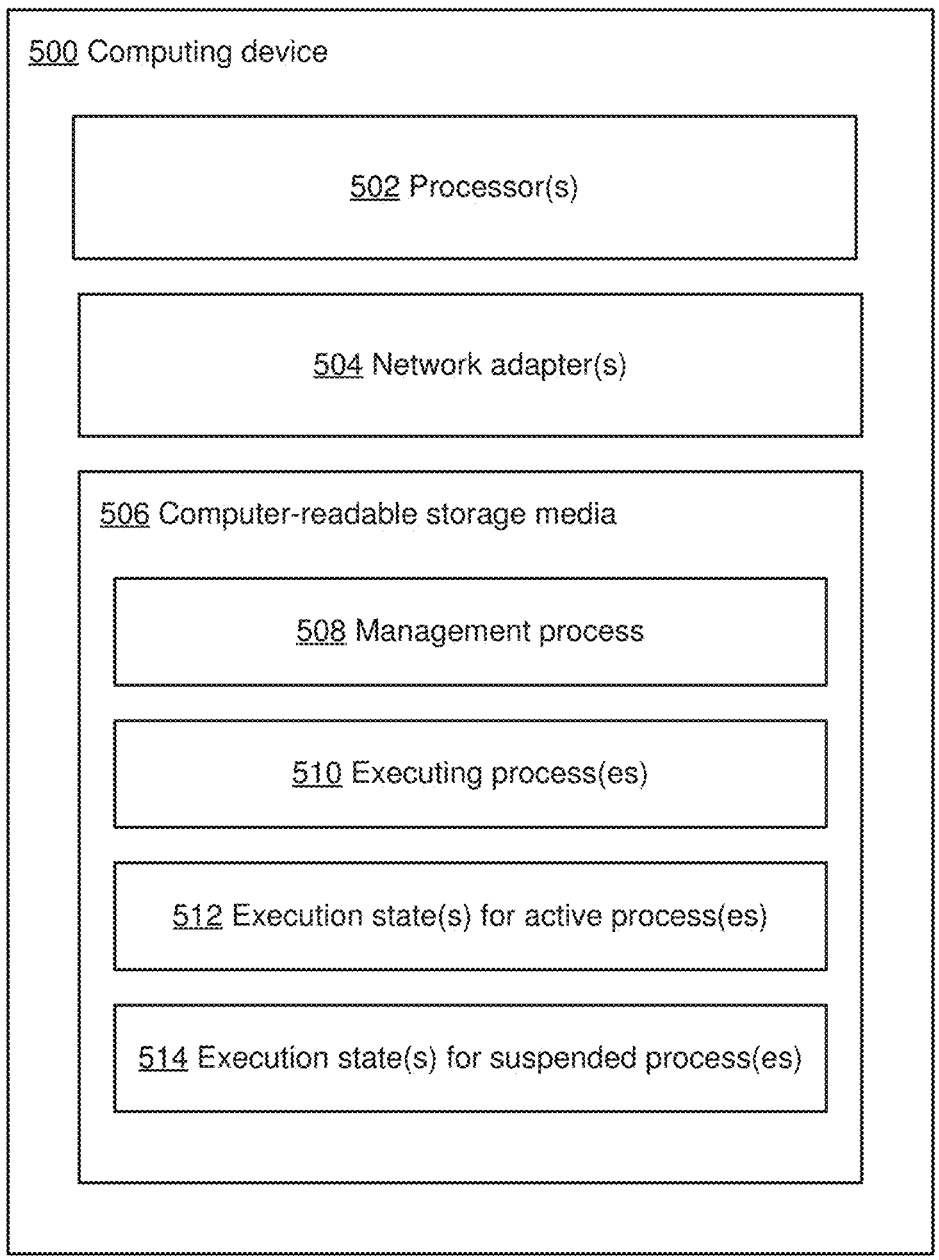
FIG. 5 is a block diagram of exemplary components of a computing device with which some embodiments may operate.

FIG. 5 illustrates one exemplary implementation of a computing device in the form of a computing device 500 that may be used in a system implementing techniques described herein, although others are possible. It should be appreciated that FIG. 8 is intended neither to be a depiction of necessary components for a computing device to operate in accordance with the principles described herein, nor a comprehensive depiction.

Computing device 500 may comprise at least one processor 502, a network adapter 504, and computer-readable storage media 506. Computing device 500 may be, for example, a desktop or laptop personal computer, a server, a distributing computing platform, a rack-mounted server, or any other suitable computing device. Network adapter 504 may be any suitable hardware and/or software to enable the computing device 500 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 506 may be adapted to store data to be processed and/or instructions to be executed by processor 502. Processor 502 enables processing of data and execution of instructions. The data and instructions may be stored on the computer-readable storage media 506.

The data and instructions stored on computer-readable storage media 506 may comprise computer-executable instructions implementing techniques which operate according to the principles described herein. In the example of FIG. 5, computer-readable storage media 506 stores computer-executable instructions implementing various facilities and storing various information as described above. Computer-readable storage media 506 may store a management process 508 that may serve as an execution environment for one or more instances of an application or for other processes, including processes to be suspended. Storage media 506 may further store one or more executing processes 510 and related execution state(s) 512, and may store execution state(s) 514 for suspended processes.

While not illustrated in FIG. 5, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
   instantiating a plurality of instances of a request/response application, each instance of the request/response application corresponding to at least one session of a plurality of sessions between the request/response application and other entities, the plurality of sessions comprising a first session and the plurality of instances comprising a first instance, the first session corresponding to a first process and being a session between the request/response application and at least one other entity, the first process being associated with an execution state, the instantiating of the first instance comprising:
      executing the request/response application; and
      upon reaching a session entry point for the request/response application, instantiating the first process for management of the session, the first process being a first virtual process;
   in response to receiving a request from the first process to suspend execution of the first process,
      serializing execution state of the first process, the execution state comprising one or more data objects indicating a session state for a series of one or more request/response interactions between the request/response application and the at least one other entity, wherein serializing the execution state comprises:
         identifying, in the execution state, one or more data objects that are global data objects for the request/response application that are used by multiple different sessions of the plurality of sessions and by multiple instances of the plurality of instances;
         refraining from serializing the one or more data objects that are global data objects;
         converting a first plurality of data objects of the execution state to a byte string, wherein the first plurality of data objects comprise at least some of the one or more data objects indicating the session state; and
         terminating the first process;
   in response to receiving a new request from the at least one other entity following terminating of the first process,
      instantiating the request/response application as at least a second process;
      deserializing the execution state of the first process, wherein deserializing the execution state comprises converting the byte string to a second plurality of data objects, the second plurality of data objects including the at least some of the one or more data objects indicating the session state for the series of one or more request/response interactions of the request/response application; and
      configuring execution state of the second process based on the second plurality of data objects and the new request received from the at least one other entity.

2. The method of claim 1, wherein:
   the method further comprises, in response to receiving the request from the first process to suspend execution of the first process and following the serializing of the execution state of the first process, transmitting the byte string to the at least one other entity; and
   receiving a new request from the at least one other entity comprises receiving a new request comprising the byte string.

3. The method of claim 1, wherein:
   the method further comprises, in response to receiving the request from the first process to suspend execution of the first process and following the serializing of the execution state of the first process,
      storing the byte string in at least one storage;
      transmitting an identifier for the byte string to the at least one other entity;
   receiving a new request from the at least one other entity comprises receiving a new request comprising the identifier for the byte string; and
   the method further comprises, in response to receiving the new request from the at least one other entity, retrieving the byte string from the at least one storage based at least in part on the identifier for the byte string.

4. The method of claim 1, wherein:
   instantiating the request/response application as at least the first process comprises instantiating the request/response application as at least a first virtual process executing in at least one virtual machine; and
   receiving the request from the first process to suspend execution of the first process comprises receiving the request from the first virtual process executing in the at least one virtual machine.

5. The method of claim 1, wherein:
   instantiating the request/response application as at least the first process comprises instantiating the request/response application as at least a first process executing on a first computing device; and
   instantiating the request/response application as at least the second process comprises instantiating the request/response application as at least a second process executing on a second computing device different from the first computing device.

6. The method of claim 5, wherein:
   instantiating the request/response application as at least the first process executing on the first computing device comprises instantiating the request/response application as at least a first virtual process executing in a first virtual machine, the first virtual machine executing on the first computing device; and
   instantiating the request/response application as at least the second process executing on the second computing device comprises instantiating the request/response application as at least a second virtual process executing in a second virtual machine, the second virtual machine executing on the second computing device different from the first computing device.

7. The method of claim 1, further comprising:
   tracking data objects created between a start of the executing of the request/response application and the reaching of the session entry point; and
   identifying as global data objects the data objects created between the start of the executing of the request/response application and the reaching of the session entry point.

8. The method of claim 7, wherein refraining from serializing the one or more data objects that are global data objects comprises:
   associating each global data object with an identifier; and
   in data objects of the execution state that are to be serialized, replacing a reference to a global data object with the identifier associated with the global data object.

9. The method of claim 1, wherein converting the first plurality of data objects to the byte string comprises:

assign each object of the first plurality of data objects an identifier;

for each reference within a first data object to a second data object of the first plurality of data objects, replace the reference within the first data object with a corresponding identifier assigned to the second data object.

10. The method of claim 1, wherein instantiating the request/response application as at least the first process comprises instantiating a conversational agent application as at least the first process, the conversational agent application implementing a conversational agent that engages in at least one dialogue with the at least one entity, a dialogue state of the at least one dialogue being indicated by the session state.

11. At least one computer-readable storage medium having encoded thereon executable instructions that, when executed by at least one processor, cause the at least one processor to carry out a method comprising:

receiving a request to suspend execution of an executing process, the executing process being an instance of a request/response application;

in response to the request, serializing execution state of the executing process, wherein serializing the execution state comprises:

identifying a plurality of data objects of the execution state, wherein the plurality of data objects comprise one or more data objects indicating a session state for a series of one or more request/response interactions between the instance of the request/response application and at least one other entity;

converting at least some of the plurality of data objects to a byte string, wherein the converting comprises refraining from converting one or more data objects that are global variables for the request/response application;

outputting the byte string; and terminating the executing process.

12. The at least one computer-readable storage medium of claim 11, further comprising:

deserializing the execution state of the executing process, wherein deserializing the execution state comprises converting the byte string to a second plurality of data objects, the second plurality of data objects including the one or more data objects indicating the session state for the series of one or more request/response interactions of the request/response application; and configuring execution state of a second executing process with the second plurality of data objects, the second executing process being a second instance of the request/response application.

13. The at least one computer-readable storage medium of claim 12, wherein:

the method further comprises receiving a new request from the at least one other entity following terminating of the executing process;

the deserializing and the configuring are performed in response to receiving the new request; and the configuring further comprises configuring the execution state of the second executing process based on the second plurality of data objects and the new request received from the at least one other entity.

14. The at least one computer-readable storage medium of claim 13, wherein the method further comprises:

instantiating the executing process as an instance of the request/response application; and instantiating the second executing process as an instance of the request/response application in response to receiving the new request.

15. An apparatus comprising:

at least one processor; and at least one storage medium having encoded thereon executable instructions that, when executed by at least one processor, cause the at least one processor to carry out a method comprising:

serializing execution state of an executing process, the executing process being an instance of a request/response application and corresponding to a session between the request/response application and at least one other entity, the execution state comprising a first plurality of data objects, the first plurality of data objects comprising one or more data objects indicating a session state for the session, the session state indicating at least a result of a series of one or more request/response interactions of the request/response application and the at least one other entity, the serializing comprising:

identifying, in the first plurality of data objects of the execution state, one or more second data objects that are global variables for the request/response application;

converting at least some of the first plurality of data objects to a byte string, wherein the converting comprises refraining from converting the one or more second data objects that are global variables.

16. The apparatus of claim 15, wherein converting the at least some of the first plurality of data objects to the byte string comprises:

assigning each data object of the first plurality of data objects an identifier;

for each reference within a first data object to a second data object of the first plurality of data objects, replacing the reference within the first data object with a corresponding identifier assigned to the second data object.

17. The apparatus of claim 16, wherein the second data object, of the first plurality of data objects, is determined to be a global variable for the request/response application.

18. The apparatus of claim 15, wherein:

the method further comprises receiving a request from the executing process to suspend execution of the executing process; and the serializing is performed in response to receiving the request.

* * * * *